3,280,025
EXTRACTION OF AROMATIC HYDROCARBONS WITH AN ALUMINUM ALKYL COMPLEX

Ronald L. Poe and Billy J. Williams, Ponca City, Okla., assignors to Continental Oil Company, Ponca City, Okla., a corporation of Oklahoma
No Drawing. Filed July 31, 1963, Ser. No. 299,067
9 Claims. (Cl. 208—322)

This invention relates to a method of separating aromatic hydrocarbons from other hydrocarbon compounds.

Various techniques are available for the separation of aromatic compounds from other hydrocarbons. Where the boiling points of the aromatic compounds differ sufficiently from other hydrocarbon compounds, fractionation is used with some degree of success. If the boiling points of the materials in question are not sufficiently different from each other, or they undergo damage when subjected to heat, then other techniques such as solvent extraction and the like are used. The recovery of aromatic compounds is important from a commercial point of view, and this is particularly true in the petroleum industry. The present invention is concerned with a method of efficiently and cheaply separating aromatic compounds from other hydrocarbon materials.

Accordingly, an object of this invention is to provide a method of separating aromatic compounds from aliphatic hydrocarbons.

Another object of this invention is to provide a method of separating aromatic hydrocarbons from cycloparaffins.

Still another object of this invention is to provide a method of separating an alkyl substituted aromatic compound from another type of aromatic compound.

Other objects and advantages of this invention will become apparent from the following description and explanation thereof.

In accordance with the present invention, a liquid containing an aromatic compound is contracted with a complex of a trialkylaluminum and a compound having the formula $R_nMX$, wherein R is alkyl, M is an element selected from the group consisting of nitrogen, arsenic, phosphorus, sulfur, selenium and tellurium; X is a halogen and $n$ is 3 or 4 depending on the particular element M, and thereby the aromatic compound is absorbed by the complex, leaving a liquid of reduced aromatic content.

The aromatic compound can be in admixture with other hydrocarbons, such as paraffinic hydrocarbons, e.g., pentane, heptane, octane, nonane, decane, undecane, dodecane, etc.; olefinic hydrocarbons such as, for example, pentene, hexene, octene, nonene, decene, undecene, etc.; cycloparaffins, e.g., cyclopentane, cyclohexane, etc. The aromatic to be extracted may be an unsubstituted benzene or naphthalene compound, or alkyl substituted benzene in which the alkyl substituent can contain about 1 to 10 carbon atoms or higher and the aromatic ring many contain 1–3 alkyl substituents. The unsubstituted aromatic compounds are extracted or absorbed first by the complex, and then the alkyl substituted aromatics are next in order of extractability but the degree of absorption diminishes as the alkyl chain increases in number of carbon atoms and/or the number of alkyl substituents on the aromatic ring increases. Hence, the present invention is useful for separating unsubstituted aromatic compounds from alkyl substituted aromatic compounds and also for separating lower molecular weight alkyl substituted aromatic compounds. Further, various isomeric forms of the same alkyl substituted aromatic compound can be separated from each other using the complex of the present invention.

The aromatic hydrocarbon to be extracted, including the substituted and/or unsubstituted types, may comprise a small fraction or part of the whole mixture or may be a high percentage of the same. In general, the mixture to be contacted with the complex can contain about 1 to 75 percent or higher of aromatic hydrocarbon, and preferably about 5 to 50 percent of the same on a weight basis. The remainder of the mixture may comprise one or more of paraffinic hydrocarbons, olefinic hydrocarbons, cycloparaffins or cycloaliphatics.

The complexing agents which are employed in carrying out the process of this invention are broadly defined by the formula $R_nMX$, wherein R is an alkyl radical; M is an element selected from the group consisting of nitrogen, arsenic, phosphorus, sulfur, selenium, and tellurium; X is a halogen; and $n$ is 3 or 4 depending on the particular element M. Preferably, the lower molecular weight alkyl radicals are employed, that is, those containing from 1 to 25 carbon atoms. As the length of the alkyl chain increases, the solubility of the complex in hydrocarbons also increases, whereby the degree of separation is reduced. Of the elements represented by M, all of which are non-metals, the preferred material is nitrogen; however, any of the other non-metals set forth also are effective as complexing agents for carrying out the process of the invention. Any of the halogens can be employed; however, the chlorides are preferred.

In order to more clearly and effectively describe the invention, the following discussion will be directed to the tetraalkylammonium halides. This is not, however, to be construed in any limited sense; and it is within the scope of the invention to employ any of the other alkyl non-metal halides within the scope of the formula set forth above. It is further to be understood that each of the other non-metals can be substituted for nitrogen in the specific examples of the complexing agents and complexes hereinafter set forth.

The complex material which is used as the absorbent or extracting agent is composed of trialkylaluminum and tetraalkyl ammonium halide. The trialkylaluminum contains alkyl radicals having an average of about 2 to 5 carbon atoms, more usually about 2 to 3 carbon atoms. The tetraalkylammonium halide contains alkyl radicals having an average of about 1 to 4 carbon atoms, more usually about 1 to 2 carbon atoms. The term "average" for the purpose of this invention is obtained by dividing the total number of carbon atoms of all radicals by the number of alkyl radicals.

The trialkylaluminum of the complex can be, for example, triethylaluminum, tripropylaluminum, tributylaluminum, etc. The tetraalkylammonium halide can be, for example, tetramethylammonium chloride, tetramethylammonium iodide, tetramethylammonium bromide, tetraethylammonium chloride, tetraethylammonium iodide, tetrapropylammonium chloride, tetrapropylammonium iodide, tetrapropylammonium bromide, tetrabutylammonium chloride, tetrabutylammonium iodide, tetrabutylammonium bromide, tetraethylammonium fluoride, tetrabutylammonium fluoride, tetrapropylammonium chloride, etc. Specific examples of complexes include 2 triethylaluminum-tetramethylammonium chloride,
2 triethylaluminum-tetramethylammonium iodide,
2 triamylaluminum-tetraethylammonium fluoride,
2 triisobutylaluminum-tetrabutylammonium bromide,
2 tributylaluminum-tetraethylammonium chloride,
2 tripropylaluminum-tetramethylammonium fluoride,
2 triisopropylaluminum-tetrapropylammonium fluoride,
2 triethylaluminum-tetrapropylammonium iodide,
2 triisopropylaluminum-tetrapropylammonium chloride,
2 triethylaluminum-tetraisobutylammonium chloride,
2 triisopropylaluminum-tetramethylammonium chloride, and
2 tripropylaluminum-tetraethylammonium bromide.

Specific examples of compounds of the other non-metals which can be employed correspond to the compounds set forth above. It is to be understood of course that the specific examples also include the corresponding 1:1 complexes.

The trialkylaluminum and tetraalkylammonium halide readily react with each other to form a 1:1 complex. The 1:1 complex comprises equal molar proportions of trialklaluminum and tetraalkylaluminum halide. The reaction to produce the 1:1 complex is exothermic and can initiate at ambient temperature level. In general, the reaction occurs at a temperature of about 50 to 150° C. and more usually about 50 to 100° C. The pressure of the reaction may vary widely within the range of subatmospheric, atmospheric and superatmospheric pressure. Usually the reaction is conducted at atmospheric pressure. The formation of the complexes occurs within a relatively short period of time, from 0.25 to 30 minutes and more usually about 0.5 to 10 minutes.

The 1:1 complex can further react with trialkylaluminum to produce a 2:1 complex in which two moles of trialkylaluminum are associated with one mole of tetraalkylaluminum halide. The amount of trialkylaluminum employed in the reaction can be controlled to regulate the amount of 2:1 complex which is ultimately formed in admixture with the 1:1 complex. In making the complex material, the relative proportions of the two compounds are controlled to produce a complex material in which the ratio of aluminum to halogen, on a molar basis, ranges from about 1:1 to 2:1, and more usually may be from about 1.2:1 to 1.8:1. The solubility of the aromatic hydrocarbons in the complex increases as the aluminum to halogen ratio increases. For handling, it is preferred that the aluminum to halogen ratio be less than 2:1 and still more preferred about 1.5:1. The 2:1 complex may be prepared by reacting the 1:1 complex with trialklaluminum at a temperature of about 50 to 150° C., more usually about 50 to 100° C. The reaction can occur at atmospheric, subatmospheric or superatmospheric pressure, however, generally at atmospheric pressure. The period of reaction for making the 1:1 or 2:1 complex may vary considerably, however, a time of about 0.25 to 30 minutes, more usually about 0.5 to 10 minutes may be used.

The extraction of aromatic compounds from liquid materials containing the same may be carried out as a batch or continuous process in either a single step or as a multi-step operation. The complex material is brought into contact with the liquid material containing the aromatic compound at a wide range of temperatures and pressure conditions. The temperature may be from about 10 to 150° C., more usually about 40 to 80° C., and preferably about 50° C. The pressure may also vary over a wide range and is generally selected to provide liquid conditions for the extraction. The pressure may be atmospheric, subatmospheric or superatmospheric, however, a pressure of about 0 to 50 p.s.i.g., more usually atmospheric, may be used. The period of contact between complex and liquid containing the aromatic is likewise a widely varying condition. The period of contact or residence time may be about 1 to 60 minutes, more usually about 5 to 10 minutes. The extraction operation can be conducted in an elongated column, on a continuous basis, with the complex flowing in countercurrent contact with liquid containing the aromatic compound. The complex material enriched with the aromatic material forms an insoluble phase which is easily separated from the liquid denuded of aromatic material. The materials, upon standing, will separate into two phases, which can be separated from each other by decantation.

The complex enriched with aromatic compound is subjected to a separation treatment for the purpose of recovering therefrom the aromatic compound. The recovery may be effected by subjecting the complex to a stripping treatment, wherein the complex, with or without the use of a stripping agent such as normally gaseous hydrocarbons, nitrogen, etc., is heated to a temperature of about 100 to 200° C., more usually about 100 to 160° C. The stripping step may be carried out under a subatmospheric pressure of about 1 mm. to 200 mm. Hg pressure, or subjected to an elevated pressure and flash vaporized into a stripping zone. The flash vaporization may be conducted at a pressure of about 10 to 100 p.s.i.g., more usually at a pressure of about 40 p.s.i.g., and a temperature of about 100 to 200° C., more usually about 100 to 160° C.

To provide a fuller understanding of the present invention reference will now be had to specific examples thereof.

Example I

A feed material containing para-xylene and n-undecane was extracted with a complex of triethylaluminum and tetramethylammonium chloride in which 1.45 moles of the former were combined with one mole of the latter. The extraction occurred at ambient temperature and atmospheric pressure in three cycles. After the feed material had been extracted, the upper phase was then extracted with fresh complex, and similarly, the upper oil phase of the second cycle was extracted with fresh complex. In each cycle the period of extraction was 10 minutes. The table given below summarizes the results obtained from the three cycles.

CYCLE I

|  | Oil Feed | Complex | Enriched Complex | Oil Phase |
|---|---|---|---|---|
| ATE [1] (g.) |  | 12.40 | 12.40 |  |
| TMAC [2] (g.) |  | 7.95 | 7.95 |  |
| n-Undecane (g.) | 19.93 |  |  | 20.01 |
| para-Xylene (g.) | 10.63 |  | 3.85 | 6.78 |

CYCLE II

|  | Oil Feed | Complex | Enriched Complex | Oil Phase |
|---|---|---|---|---|
| ATE [1] (g.) |  | 12.44 | 12.44 |  |
| TMAC [2] (g.) |  | 7.99 | 7.99 |  |
| n-Undecane (g.) | 16.80 |  |  | 16.97 |
| para-Xylene (g.) | 5.70 |  | 2.50 | 3.20 |

CYCLE III

|  | Oil Feed | Complex | Enriched Complex | Oil Phase |
|---|---|---|---|---|
| ATE [1] (g.) |  | 12.41 | 12.41 |  |
| TMAC [2] (g.) |  | 7.95 | 7.95 |  |
| n-Undecane (g.) | 12.34 |  |  | 12.08 |
| para-Xylene (g.) | 2.33 |  | 1.29 | 1.04 |

[1] Triethylaluminum.
[2] Tetramethylammonium chloride.

Example II

A mixture of benzene and cylohexane was extracted under similar conditions to those described in Example I. The results are reported below.

CYCLE I

|  | Oil Feed | Complex | Enriched Complex | Oil Phase |
|---|---|---|---|---|
| ATE [1] (g.) |  | 12.46 | 12.46 |  |
| TMAC [2] (g.) |  | 8.01 | 8.01 |  |
| Cyclohexane (g.) | 14.25 |  | 3.30 | 10.95 |
| Benzene (g.) | 18.11 |  | 10.68 | 7.43 |

CYCLE II

|  | Oil Feed | Complex | Enriched Complex | Oil Phase |
|---|---|---|---|---|
| ATE [1] (g.) |  | 12.46 | 12.46 |  |
| TMAC [2] (g.) |  | 8.05 | 8.50 |  |
| Cyclohexane (g.) | 8.97 |  | 2.92 | 6.05 |
| Benzene (g.) | 6.08 |  | 4.46 | 1.62 |

CYCLE III

|  | Oil Feed | Complex | Enriched Complex | Oil Phase |
|---|---|---|---|---|
| ATE [1] (g.) |  | 12.45 | 12.45 |  |
| TMAC [2] (g.) |  | 8.01 | 8.01 |  |
| Cyclohexane (g.) | 4.75 |  | 1.98 | 2.77 |
| Benzene (g.) | 1.27 |  | 1.11 | 0.16 |

[1] Triethylaluminum.
[2] Tetramethylammonium chloride.

Example III

To determine the effect of various aluminum to chlorine ratios on aromatic solubility, a series of runs were made at ambient temperature and pressure and the results are reported below. In each case, a different complex was contacted with the same kind of feed material in a single step operation.

|  | Oil Feed | Complex | Enriched Complex | Oil Phase |
|---|---|---|---|---|
| ATE [1] (g.) |  | 10.6 | 10.6 |  |
| TMAC [2] (g.) |  | 10.2 | 10.2 |  |
| para-Xylene (g.) | 10.7 |  | 3.7 | 7.0 |
| n-Undecane (g.) | 20.0 |  | 0.2 | 20.1 |
| ATE [1] (g.) |  | 14.1 | 14.1 |  |
| TMAC [2] (g.) |  | 10.3 | 10.3 |  |
| para-Xylene (g.) | 10.7 |  | 4.6 | 6.1 |
| n-Undecane (g.) | 20.0 |  | 0.4 | 20.0 |
| ATE [1] (g.) |  | 17.6 | 17.6 |  |
| TMAC [2] (g.) |  | 10.1 | 10.1 |  |
| para-Xylene (g.) | 10.6 |  | 5.7 | 4.9 |
| n-Undecane (g.) | 19.9 |  | 0.1 | 19.9 |
| ATE [1] (g.) |  | 20.9 | 20.9 |  |
| TMAC [2] (g.) |  | 10.4 | 10.4 |  |
| para-Xylene (g.) | 10.7 |  | 6.4 | 4.3 |
| n-Undecane (g.) | 20.0 |  | 0.2 | 19.8 |

[1] Triethylaluminum.
[2] Tetramethylammonium chloride.

It will be noted that as the aluminum to chlorine ratio increased, the solubility of benzene in the complex also increased.

Example IV

The solubility of various aromatic compounds in a complex of triethylaluminum and tetramethylammonium chloride having an aluminum to chloride ratio of 1.45 was determined and the results are tabulated below. The solubilities were determined under ambient conditions.

| Aromatic compound: | Solubility in grams per gram of complex |
|---|---|
| Benzene | 2.37 |
| Toluene | 2.28 |
| Ethylbenzene | 1.82 |
| Cumene | 1.36 |
| n-Propylbenzene | 1.33 |
| t-Butylbenzene | 1.01 |
| n-Butylbenzene | 0.98 |
| n-Octylbenzene | 0.44 |

It will be noted that the branched nature of the substituent seems to have little or no difference on solubility as can be seen from cumene and n-propylbenzene and n-butyl- and t-butylbenzene.

Example V

The effect of the number of carbon atoms in the side chain on solubility in a complex of triethylaluminum and tetramethylammonium chloride having an aluminum to chlorine ratio of 1.45 was also determined under ambient conditions. The results are reported below.

| Hydrocarbon: | Grams of hydrocarbon per gram of complex |
|---|---|
| Ortho-xylene | 1.91 |
| Meta-xylene | 1.87 |
| Ethylbenzene | 1.85 |
| Para-xylene | 1.71 |
| n-Propylbenzene | 1.33 |
| Cumene | 1.36 |
| Mesitylene | 0.70 |
| n-Butylbenzene | 0.98 |
| t-Butylbenzene | 1.00 |
| p-Cymene | 0.61 |

With respect to the first four compounds, it will be noted that para-xylene can be separated from the other three compounds. Although mesitylene has the same number of side chain carbon atoms, it has a lower solubility and thus can be separated from the other two, namely, n-propylbenzene and cumene which are approximately the same in solubility. The same conclusion can be drawn with respect to para-cymene and the other compounds, viz., n-butylbenzene and t-butylbenzene.

Although this invention has been described with respect to particular embodiments thereof, it is not to be so limited, as changes and modifications may be made therein which are within the spirit and scope of the invention as defined by the appended claims.

We claim:

1. A process which comprises contacting a hydrocarbon mixture including an aromatic compound with a complex of a trialkylaluminum and a compound having the formula $R_nMX$, wherein R is an alkyl radical; M is an element selected from the group consisting of nitrogen, arsenic, phosphorus, sulfur, selenium, and tellurium; X is a halogen; $n$ varies from 3 to 4 and the ratio of aluminum to halogen in said complex is between about 1:1 and 2:1, thereby forming a hydrocarbon phase and a complex phase enriched with the aromatic compound, and separating the enriched complex phase from the hydrocarbon phase.

2. The process of claim 1 wherein the hydrocarbon mixture contains an aliphatic hydrocarbon and aromatic compound.

3. The process of claim 1 wherein the hydrocarbon mixture contains a cycloaliphatic hydrocarbon and an aromatic hydrocarbon.

4. A process which comprises contacting a petroleum fraction containing an aromatic compound with a complex of a trialkylaluminum and tetraalkylammonium halide, said complex having a ratio of aluminum to halogen between about 1:1 and 2:1, thereby forming a hydrocarbon phase and a complex phase enriched with the aromatic compound, and separating the complex phase from the hydrocarbon phase.

5. The process of claim 4 wherein the complex phase has an aluminum to halogen ratio of about 1.2 to 1.8:1.

6. The process of claim 1 wherein the trialkylaluminum is triethylaluminum and the compound having the formula $R_nMX$ is tetramethylammonium chloride.

7. The process of claim 6 wherein the hydrocarbon mixture is a petroleum fraction.

8. The process of claim 1 wherein the trialkylaluminum has alkyl substituents having an average number of carbon atoms of about 2 to 5, the compound having the formula $R_nMX$ is a tetraalkylammonium halide and has an average number of carbon atoms of about 1 to 4.

9. The process of claim 8 wherein the hydrocarbon mixture is a petroleum fraction.

References Cited by the Applicant

Chemical Abstracts, 27, 5233.
Gazzetta Chemica Italian 89, 2532–42 (1959).

DELBERT E. GANTZ, *Primary Examiner.*

ALPHONSO D. SULLIVAN, *Examiner.*

H. LEVINE, *Assistant Examiner.*